United States Patent [19]
Kim

[11] Patent Number: 5,943,781
[45] Date of Patent: Aug. 31, 1999

[54] SAFETY RAZOR BLADE TOOL

[75] Inventor: Jisu Kim, New York, N.Y.

[73] Assignee: Violex-Bic S.A., Attica, Greece

[ * ] Notice: This patent is subject to a terminal disclaimer.

[21] Appl. No.: 08/954,692

[22] Filed: Oct. 20, 1997

Related U.S. Application Data

[63] Continuation-in-part of application No. 08/582,388, Jan. 3, 1996, Pat. No. 5,771,589.

[51] Int. Cl.$^6$ .................................................... B26B 21/54
[52] U.S. Cl. ..................................... 30/346.58; 30/346.53
[58] Field of Search ........................... 30/346.53, 346.58, 30/346.6, 346.61, 169, 342; 15/236.02

[56] References Cited

U.S. PATENT DOCUMENTS

| | | | |
|---|---|---|---|
| 1,799,517 | 4/1931 | Kaufman | 30/346.58 |
| 3,413,720 | 12/1968 | Mullen | 30/526 X |
| 4,059,891 | 11/1977 | Panagiotoulis | 30/50 |
| 4,612,707 | 9/1986 | Shea | 30/162 |
| 4,619,799 | 10/1986 | Teerling | 264/101 |
| 4,969,300 | 12/1990 | Blank et al. | 30/169 |
| 4,979,300 | 12/1990 | Blank et al. | 30/169 |
| 5,615,597 | 4/1997 | Schoenmeyr | 92/103 |
| 5,666,732 | 9/1997 | Shea | 30/329 |
| 5,771,589 | 6/1998 | Kim | 30/346.58 |

*Primary Examiner*—M. Rachuba
*Assistant Examiner*—Stephen Choi
*Attorney, Agent, or Firm*—Baker & Botts, L.L.P.

[57] ABSTRACT

A safety razor blade tool comprises a substantially rectangular, single-edged safety razor blade having a cutting edge and an opposing non-cutting edge and a thermoplastic protective cover fixedly attached to the non-cutting edge. The protective cover is substantially coextensive with the length of the non-cutting edge of the blade and has a resilient, slip-resistant surface. The protective cover comprises two substantially identical, complimentary cover parts. Each cover part comprises an injection-molded substantially rigid inner layer of thermoplastic material and a rubberized outer layer covering the rigid inner layer. The outer layer comprises a compatible, injection-molded thermoplastic rubber.

4 Claims, 5 Drawing Sheets

SAFETY RAZOR BLADE TOOL

CROSS-REFERENCE TO RELATED APPLICATIONS

This application is a continuation-in-part of U.S. patent application Ser. No. 08/582,388, filed on Jan. 3, 1996, now U.S. Pat. No. 5,771,589, which is incorporated by reference herein.

BACKGROUND OF THE INVENTION

The present invention is directed to a disposable, single-edged safety razor blade of the type having a cutting edge and an opposing, blunt non-cutting edge and, more particularly, to an improved safety razor blade tool having a "rubberized," slip-resistant protective cover over the non-cutting edge to allow for a more comfortable and secure grip of the safety razor blade when used as a cutting tool.

Referring to FIG. 1, there is shown a disposable, single-edge safety razor blade 15 that was originally developed for shaving. The blade 15 is substantially rectangular and has a lengthwise cutting edge 16 and an opposing non-cutting edge 17. A thin metal strip 18, coextensive with the length of the blade is wrapped around the non-cutting edge 17 and crimped in place to serve as a protective cover for the non-cutting edge. This strip 18 also provides a thicker profile for easier handling and holding of the blade 15 by a user.

While single-edge disposable razor blades have long been supplanted for shaving purposes by more modern razor blades and disposable razors, such blades have found widespread use as general purpose, low cost, disposable, light-duty cutting tools. For example, people, use the safety razor blades for scraping paint from glass and for cutting sheets of paper and other materials.

While blade holders of various designs providing a good grip for cutting for the type of blade shown in FIG. 1 are known and available, most users prefer to use the blade without a holder by grasping the metal strip 18 during use. Accordingly, it would be desirable to provide the disposable, single-edged razor blade of the type shown in FIG. 1 with a protective cover for the non-cutting edge that provides a more secure grip to improve the effectiveness of the blade as a general purpose cutting tool.

BRIEF SUMMARY OF THE INVENTION

The present invention is directed to a safety razor blade tool comprising a substantially rectangular, single-edged safety razor blade having a cutting edge and an opposing non-cutting edge and a thermoplastic protective cover fixedly attached to the non-cutting edge. The protective cover is substantially coextensive with the length of the non-cutting edge of the blade and has a resilient, slip-resistant surface. The protective cover comprises two substantially identical, complimentary cover parts. Each cover part comprises an injection-molded substantially rigid inner layer of thermoplastic material and a rubberized outer layer covering the rigid inner layer, the outer layer comprising a compatible, injection-molded thermoplastic rubber.

In a preferred embodiment, the thermoplastic rigid inner layer comprises a polyolefin and the rubberized outer layer comprises ethylene-propylene-diene monomer rubber. In this embodiment, most preferably, the polyolefin is polypropylene. In another preferred embodiment, the thermoplastic rigid inner layer comprises a polyvinyl chloride and the rubberized outer layer comprises a hydrogenated adduct of a styrene-butadiene block copolymer with maleic anhydride.

The safety razor blade tool according to the present invention may be produced by providing a substantially rectangular, single-edged safety razor blade having a cutting edge and an opposing non-cutting edge. The substantially rigid thermoplastic is then injected in a viscous state into an injection-molding device. Next, the substantially rigid thermoplastic in a viscous state is allowed to solidify. After the substantially rigid thermoplastic has solidified, a thermoplastic rubber in a viscous state is injected into the injection-molding device, the thermoplastic rubber being compatible with the substantially rigid thermoplastic. Next, a first cover part comprising an inner layer and an outer layer is formed, the inner layer comprising the substantially rigid thermoplastic and the outer layer comprising the compatible thermoplastic rubber covering the inner layer. A second cover part is formed either sequentially with or, preferably, simultaneously with the first cover part. The second cover part is substantially identical to and complementary with the first cover. Finally, the first cover part and the second part are fixedly attached to the non-cutting edge of the razor safety blade.

In a preferred embodiment of the method of producing the safety razor blade tool, the attaching step comprises joining the cover parts of the safety razor blade tool by ultrasonic welding.

DETAILED DESCRIPTION OF THE INVENTION

Figure 1:
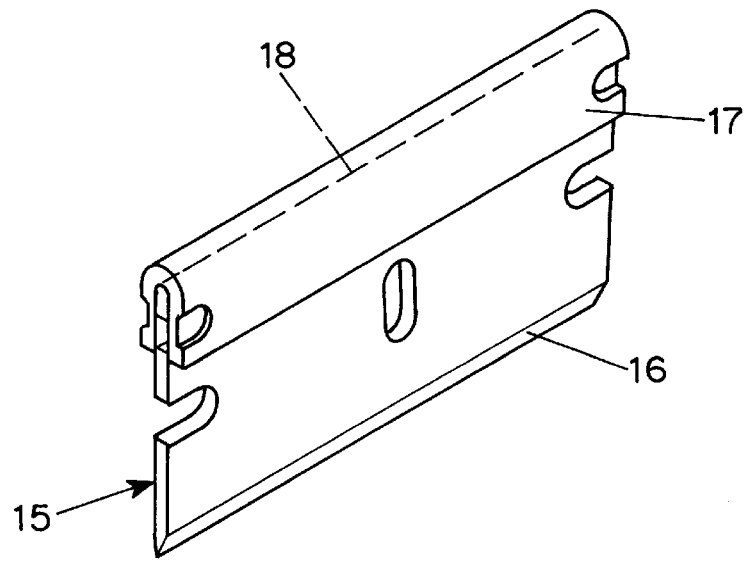
FIG. 1 is an isometric view of a prior art safety razor blade.
Figure 2:
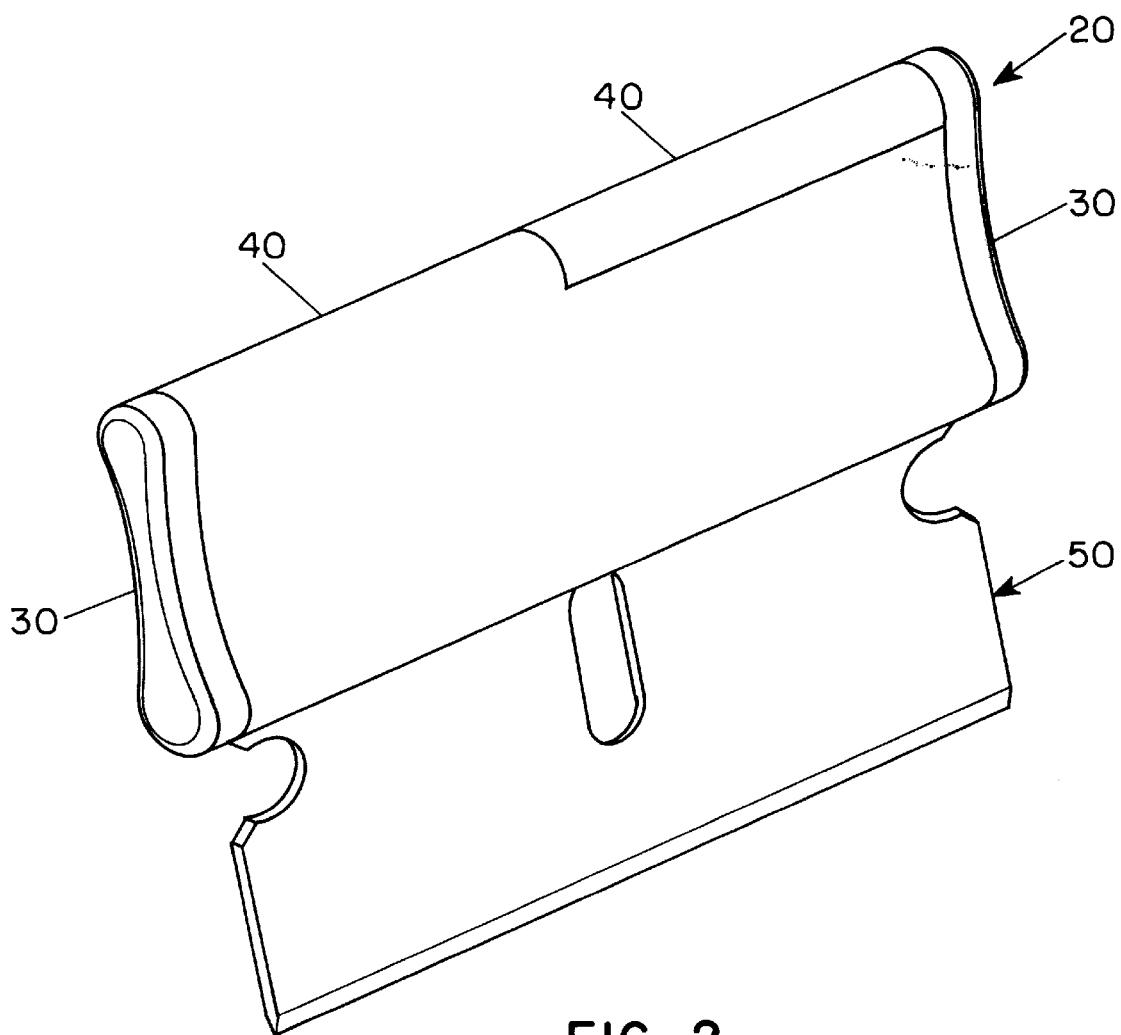
FIG. 2 is an isometric view of a safety razor blade tool according to a preferred embodiment of the present invention.
Figure 5:
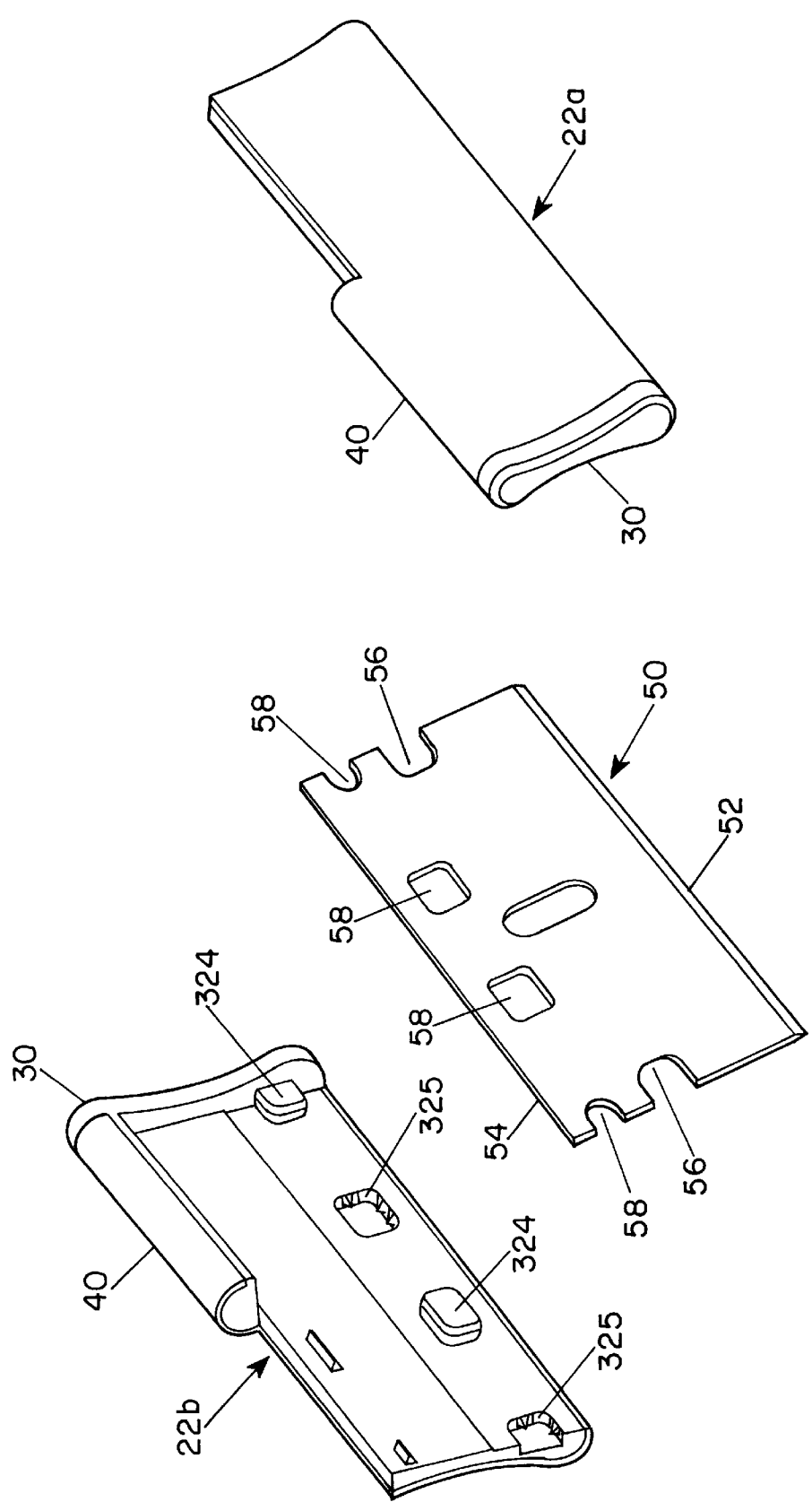
FIG. 5 is an exploded view of a protective cover and a safety razor blade, both according to a preferred embodiment of the present invention.

Referring to FIG. 2, a safety razor blade according to a preferred embodiment of the present invention comprises a protective cover 20 fixedly attached to a safety razor blade 50. The protective cover 20 is substantially coextensive in length with the length of the blade 50. As shown in FIG. 5, the protective cover 20 comprises two cover parts, 22a and 22b. The two cover parts 22a and 22b are substantially identical, complementary parts, which hold the blade 50 between them. As shown in FIG. 2, the protective cover 20 preferably contains an inwardly curved outer surface for easier handling and holding of the safety razor blade tool by a user.

Figure 3:
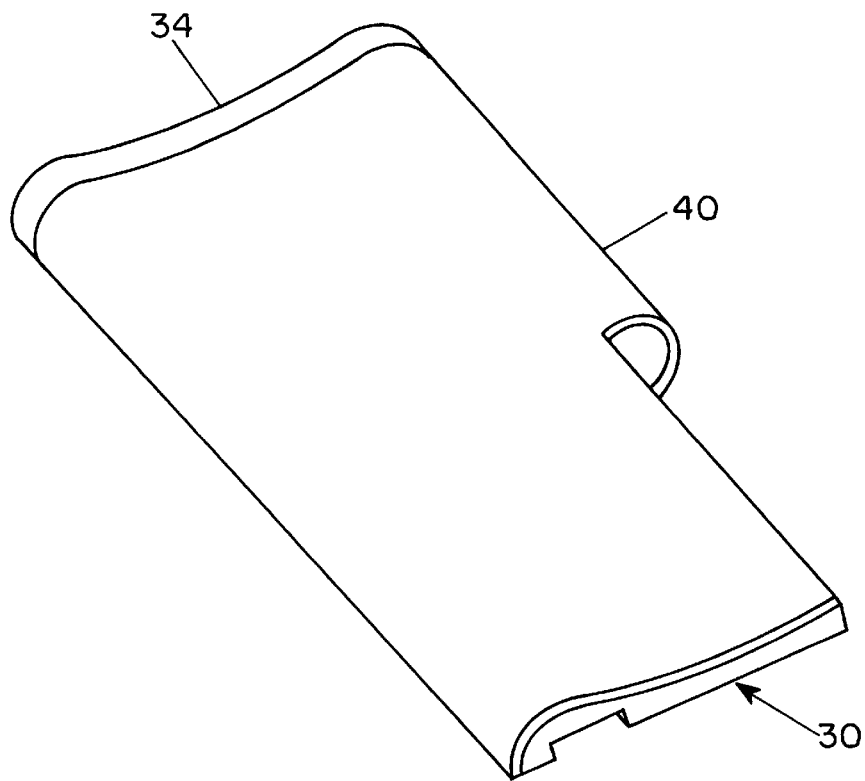
FIG. 3 is an isometric view of a protective cover part according to a preferred embodiment of the present invention.
Figure 4:
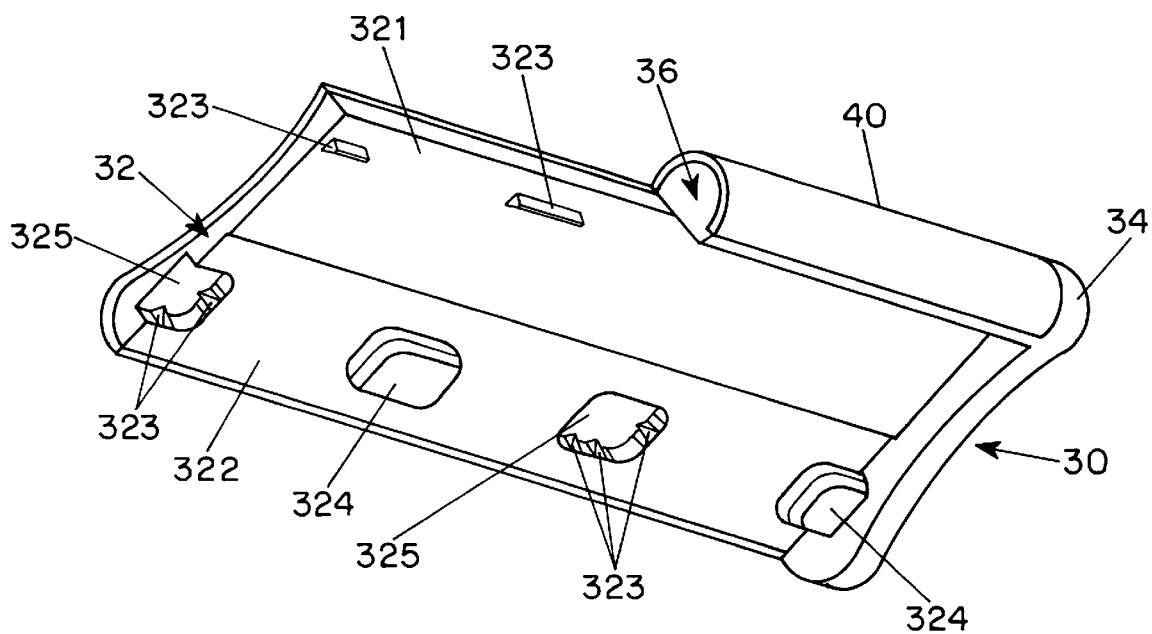
FIG. 4 is another isometric view of a protective cover part according to a preferred embodiment of the present invention.

As shown in FIGS. 3 and 4, each cover part comprises a rigid inner layer 30 and a rubberized outer layer 40. The rigid inner layer 30 provides support for the safety razor blade tool, and the rubberized outer layer 40 provides a resilient, slip-resistant surface for the safety razor blade tool.

As shown in FIG. 4, the rigid inner layer 30 comprises a base 32, a shoulder 34 disposed to one side of the base 32, and a rounded, top portion 36 disposed along the top edge of the base 32, extending from the shoulder 34 to about one half the length of the base 32. The rubberized outer layer 40 covers the outer surface of the base 32 and the rounded, top portion 36, but does not cover the shoulder 34.

The base 32 preferably contains two sections, an upper section 321 and a lower section 322. The lower section 322 is slightly recessed with regard to the plane of the upper section 321 to accommodate the thickness of a safety razor blade, which will be held between the two cover parts. In addition, the lower section 321 preferably contains alternating projections 324 and recesses 325 to assist in retaining the razor blade in position. Both the upper section 321 and the lower section 322 preferably contain small protrusions 323 that facilitate ultrasonic welding of two cover parts together.

As shown in FIG. 5, the safety razor blade 50 contains a cutting edge 52 and a non-cutting edge 54. Holes 58 are located proximate to the non-cutting edge 54. The holes are arranged in size and location so that the projections 324 of cover parts 22a and 22b fit through them. The razor blade 50 also contains a notch 56 on each side which is disposed below the level of the blade that is covered by the cover parts 22a and 22b.

Figure 8:
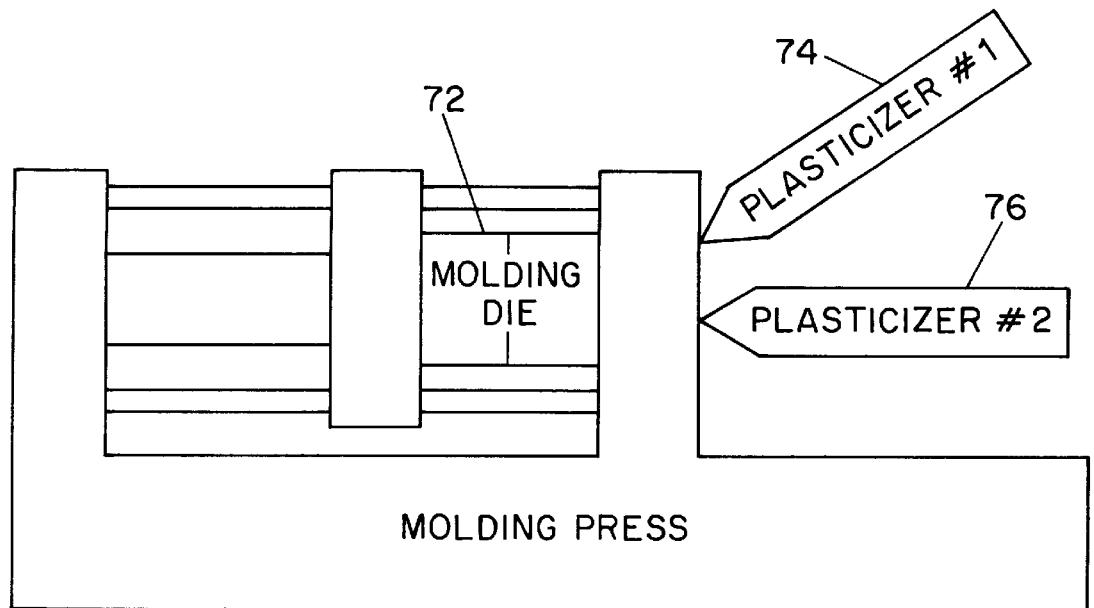
FIG. 8 is a schematic representation of a molding press used for producing the protective cover parts of a safety razor blade tool according to a preferred embodiment of the present invention.

The cover parts 22a and 22b are produced by injection molding. Preferably, the rigid inner layer 30 and the rubberized outer layer 40 are produced by a multi-component injection molding process. As shown in FIG. 8, a multi-component molding press 70 contains a molding die 72 and multiple plasticizer injection units 74 and 76. The multi-component molding press 70 is of the type that is commercially available, such as model number ES330H sold by Engel of Schwertberg, Austria. To produce a cover part with the molding press 70, the plasticizer injection unit 74 injects a material for the rigid inner layer 30 into a cavity of the mold die 72. Next, the material for the rigid inner layer 30 is allowed to solidify. After solidification, a mechanism within the mold press 70 or the mold die 72 transports the rigid inner layer 30 and cavity to an alternate position. The mechanism may transport only the rigid inner layer 30 and cavity or may transport the entire mold die 72. In a preferred embodiment, the transport mechanism is built within the mold die 72 and transports the rigid inner layer 30 and cavity within the mold die 72. After transportation of the rigid inner layer 30 and cavity, the plasticizer injection unit 76 injects a material for the rubberized outer layer 40 into the mold die 72. Preferably, the operation of the plasticizer injection units 74 and 76 is simultaneous. Alternatively, however, the operation of the plasticizer injection units 74 and 76 may be sequential. After the material for the rubberized outer layer 40 solidifies, a cover part is ejected from the mold press 70.

Suitable thermoplastic materials for forming the rigid inner layer 30 include polyolefins (such as high density polyethelene and polypropylene) and polyvinyl chloride. Advantageously, the material for the rubberized outer layer 40 is chosen from thermoplastics that form a strong and stable adhesion with the thermoplastic material of the rigid inner layer 30. Compatible thermoplastic material combinations for the rubberized outer layer 40 and rigid inner layer 30 include an ethylene-propylene-diene monomer rubber, such as Sarlink sold by DSM Thermoplastic Elastomers of Leominster, Mass., and a polypropylene, such as Stamylan sold by DSM Engineering Plastics of Evansville, Ind. In a preferred embodiment, the thermoplastic material for the rubberized outer layer 40 is Sarlink 3160, and the thermoplastic material for the rigid inner layer 30 is Stamylan 13E 10 having a melt flow index of 1.2 g/10 minutes. Another compatible thermoplastic combination for the outer and inner layers includes a hydrogenated adduct of a styrene-butadiene block copolymer with maleic anhydride, such as Craton sold by Shell Chemical Company of Houston, Texas (for the rubberized outer layer) and a polyvinyl chloride (for the rigid inner layer).

As shown in FIG. 5, a safety razor blade tool according to the present invention is formed by placing a razor blade 50 between two cover parts 22a and 22b, and aligning the holes 58 with the projections 324 and recesses 325 of the cover parts. The two cover parts 22a and 22b are then fixedly attached to each other and the blade 50.

Figure 9:
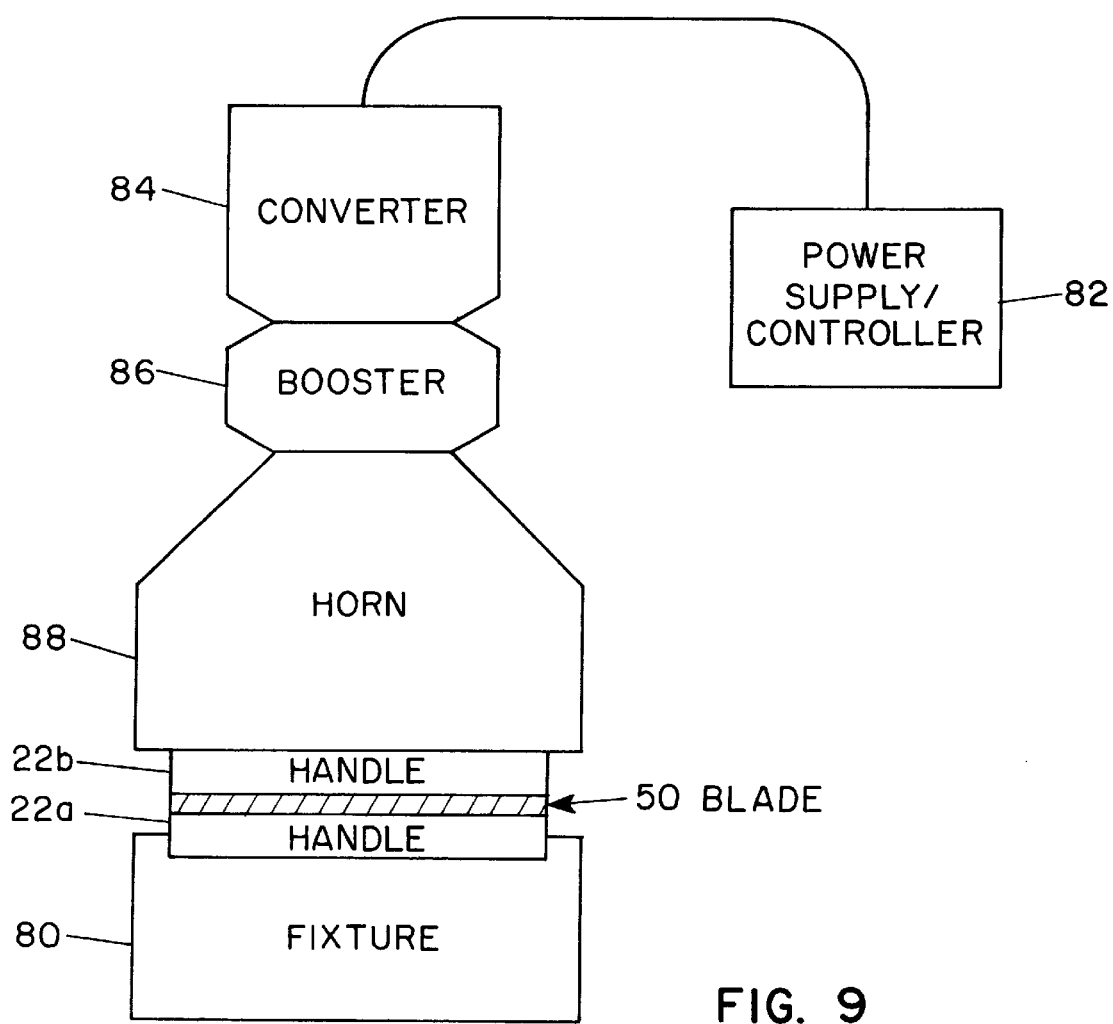
FIG. 9 is a schematic representation of means for fixedly attaching a protective cover to a safety razor blade in accordance with a preferred embodiment of the present invention.

Preferably, the two cover parts 22a and 22b are fixedly attached to each other by ultrasonic welding. To ultrasonically weld cover parts 22a and 22b, as shown schematically in FIG. 9, cover part 22a is placed in a holding fixture 80. The fixture 80 is a block typically made of steel or aluminum into which a cavity is machined. The shape of the cavity is such that it allows the exterior surfaces of cover part 22a to fit conformally within the cavity thus immobilizing the part without additional means. Ultrasonic energy in the range of about 20 to 40 kHz is then applied directly to cover part 22b by conventional means, such as a power supply and controller 82, a converter 84, a booster 86, and a horn 88. The energy is delivered in a direction perpendicular to the major plane of cover part 22b. This energy causes the cover part 22b to vibrate relative to the immobilized cover part 22a, which is held in place by the holding fixture 80. The heat of friction of the relative motion causes the surfaces of the cover parts in contact with each other to melt together.

Figure 6:
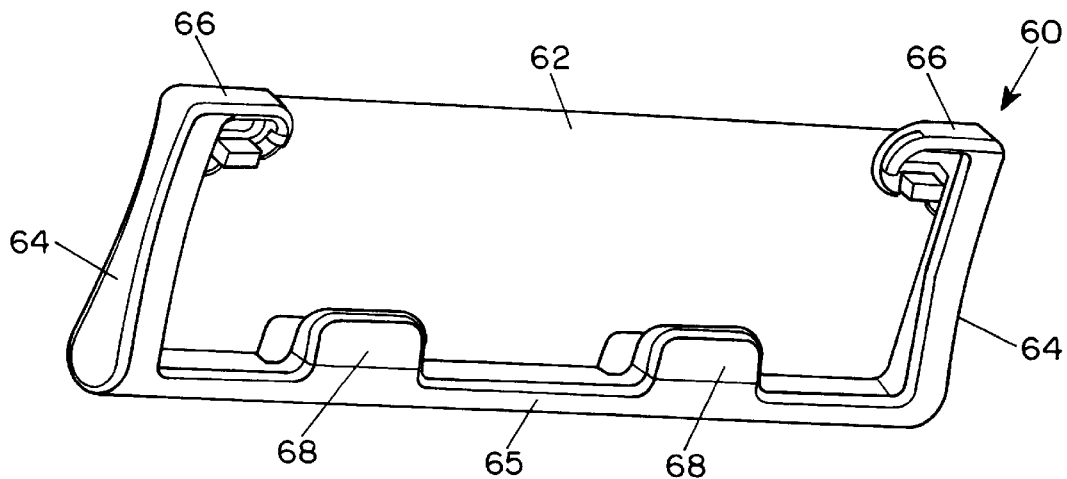
FIG. 6 is an isometric view of a safety razor blade sheath according to a preferred embodiment of the present invention.

Referring to FIG. 6, a preferred embodiment of the safety razor blade tool of the present invention also contains a razor blade sheath 60. The razor blade sheath 60 comprises a planar back 62, a shoulder 64 on each side of the planar back 62, a lower portion 65, and tabs 68 attached to the lower portion 65, which are substantially parallel to the plane of back 62. Each shoulder 64 contains an inward projection 66 that fits within one of the notches 56 on the razor blade 50.

Figure 7:
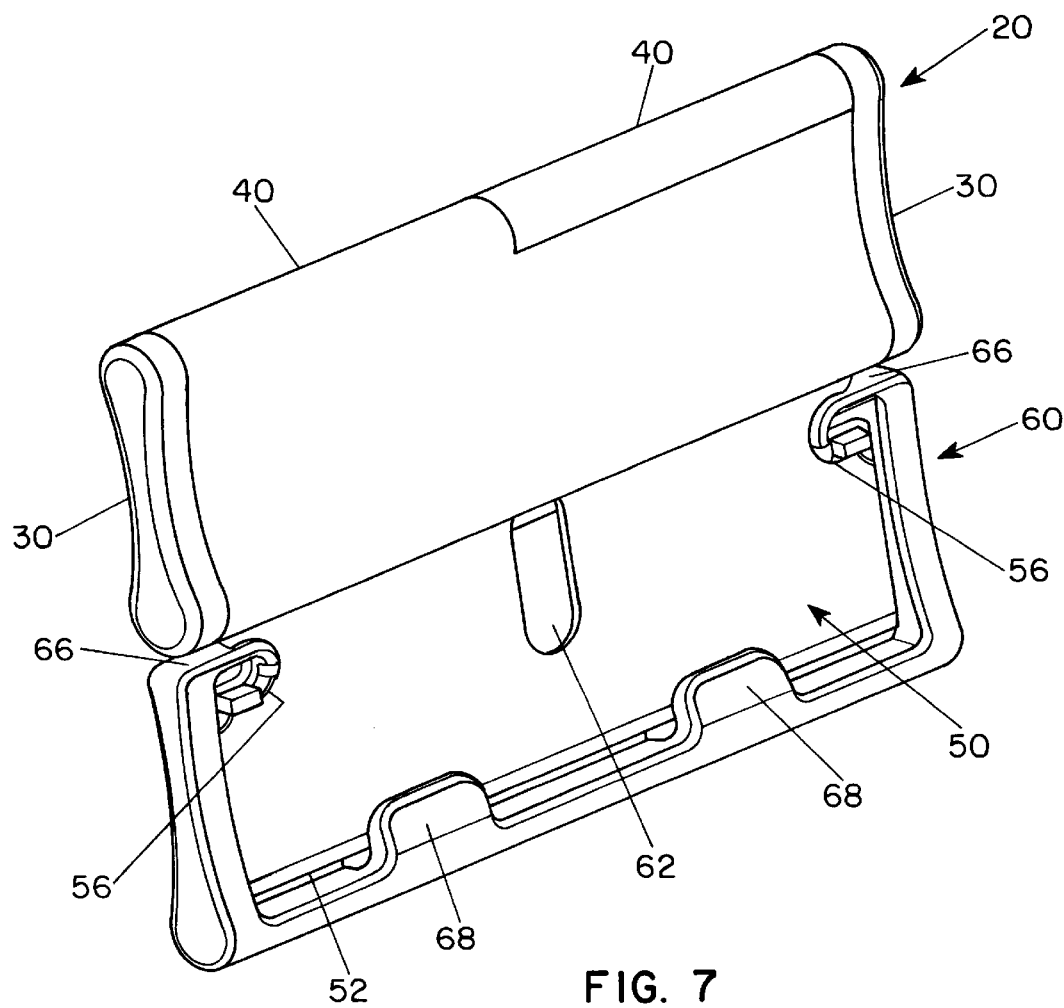
FIG. 7 is an isometric view of a safety razor blade tool and an attached razor blade sheath according to a preferred embodiment of the present invention.

FIG. 7 shows the engagement of the safety razor blade tool and the razor blade sheath 60. The cutting edge 52 of the blade 50 is inserted at an angle between the planar back 62 and the tabs 68. The safety razor blade tool is then rotated until the notches 56 of the blade 50 engage the projections 66 of the sheath.

Suitable thermoplastic materials for forming the blade sheath 60 include polyolefins such as high density polyethylene and polypropylene, polyvinyl chloride, acrylic, and styrene-butadiene. Preferably, the blade sheath 60 is formed from a mixture of equal parts of transparent polystyrene and styrene-butadiene.

Although the present invention has been described with reference to certain preferred embodiments, various modifications, alterations, and substitutions will be known or obvious to those skilled in the art without departing from the spirit and scope of the invention, as defined by the appended claims.

I claim:

1. A safety razor blade tool, comprising:
   a substantially rectangular, single-edged safety razor blade having a cutting edge and an opposing non-cutting edge; and
   a thermoplastic protective cover fixedly attached to the non-cutting edge, the protective cover comprising two substantially identical, complementary cover parts, each cover part comprising an injection-molded substantially rigid inner layer of thermoplastic material and a rubberized outer layer covering the rigid inner layer, the outer layer comprising a compatible, injection-molded thermoplastic rubber, the protective cover being substantially coextensive with the length of the non-cutting edge of the blade and having a resilient, slip-resistant surface.

2. The safety razor blade tool of claim 1, wherein the thermoplastic rigid inner layer comprises a polyolefin and the rubberized outer layer comprises an ethylene-propylene-diene monomer rubber.

3. The safety razor blade tool of claim 2, wherein the polyolefin is polypropylene.

4. The safety razor blade tool of claim 1, wherein the thermoplastic rigid inner layer comprises a polyvinyl chloride and the rubberized outer layer comprises a hydrogenated adduct of a styrene-butadiene block copolymer with maleic anhydride.

* * * * *